(12) United States Patent
Kenmochi

(10) Patent No.: US 6,975,777 B1
(45) Date of Patent: Dec. 13, 2005

(54) APPARATUS AND METHOD OF BLOCK NOISE DETECTION AND REDUCTION

(75) Inventor: Takashi Kenmochi, Yokosuka (JP)

(73) Assignee: Victor Company of Japan, Ltd., Yokohama (JP)

(*) Notice: Subject to any disclaimer, the term of this patent is extended or adjusted under 35 U.S.C. 154(b) by 0 days.

(21) Appl. No.: 09/522,711

(22) Filed: Mar. 10, 2000

(30) Foreign Application Priority Data

Mar. 26, 1999 (JP) ................................. 11-083190
Oct. 20, 1999 (JP) ................................. 11-297915
Dec. 15, 1999 (JP) ................................. 11-355563

(51) Int. Cl.[7] .............................. G06K 9/36; G06K 9/46
(52) U.S. Cl. .................................. 382/268; 375/240.27
(58) Field of Search ........................ 382/268–275, 382/260, 262, 266, 232, 233, 236, 238; 348/606, 348/607, 701, 181, 498, 501; 375/240.27, 375/240.29, 240.25, 240.26, 240.28; 386/13, 386/85

(56) References Cited

U.S. PATENT DOCUMENTS 5,337,088 A  8/1994 Honjo ........................ 348/420
5,654,759 A  8/1997 Augenbraun ................ 348/405
5,796,875 A  8/1998 Read .......................... 382/261

FOREIGN PATENT DOCUMENTS

| EP | 0808068 A2 | 11/1997 |
| EP | 0881837 A1 | 12/1998 |
| EP | 0886444 A2 | 12/1998 |
| GB | 2284960 A  | 6/1995  |
| JP | 3-174891   | 7/1991  |
| JP | 8-149470   | 6/1996  |

*Primary Examiner*—Joseph Mancuso
*Assistant Examiner*—Duy M. Dang
(74) *Attorney, Agent, or Firm*—Jacobson Holman PLLC (57) ABSTRACT

Block noises generated on an input video signal that has been coded and decoded per pixel block are detected. The input video signal is differentiated per pixel to obtain a differentiated signal. Impulses of the differentiated signal are detected to obtain a detection signal carrying the impulses. The detection signal is integrated and compared with a reference signal to determine whether the block noise is generated on the input video signal. For noise reduction, the detection signal is filtered to obtain a corrected signal. The input video signal is delayed by a predetermined period. The correction signal is added to the delayed video signal to cancel the difference in signal level on the boundary between a first pixel block on which a block noise is generated and a second block adjacent to the first pixel block of the input video signal.

10 Claims, 7 Drawing Sheets

| c-d | > | d-e | AND | b-c | > | a-b | BUT NOT
$b \leqq c \leqq d$ AND $b \geqq c \geqq d$

APPARATUS AND METHOD OF BLOCK NOISE DETECTION AND REDUCTION

BACKGROUND OF THE INVENTION

The present invention relates to detection and reduction of block noises generated when video signals are coded and decoded per pixel block.

A well known encoding technique is to compress video signals per pixel block with exploiting correlation between adjacent pixels within each block. Each pixel block consists of a predetermined number of pixels in the horizontal and the vertical directions.

The coded video signals are stored in a storage medium or transferred to a decoding apparatus via a transfer cable. After storage or transfer, the coded video signals are expanded per pixel block for decoding.

The lower the compression ratio, the higher the image quality. On the other hand, the higher the compression ratio, the smaller the amount of video data stored in a storage medium or transferred along a transfer cable. High compression ratio would however cause a difference in gradation between adjacent pixel blocks. The gradation difference is called a block noise and noticeable on video signal portions with small gradation changes.

Block noises would also be generated when video signals are reproduced from a storage medium by a dirty or worn-out magnetic head. These noises are also noticeable on a monitor.

Several techniques have been developed for detection and reduction of block noises.

Figure 1:
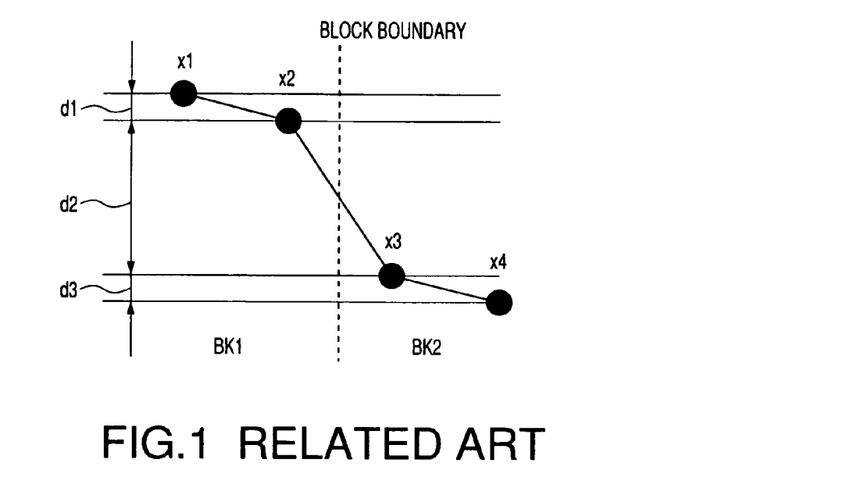
FIG. 1 illustrates a conventional technique for detecting and reducing block noises.

One of the techniques is to smooth the boundary between adjacent pixel blocks over which block noises are generated, by interpolation, as shown in FIG. 1.

This figure shows signal levels of four pixels x1 to x4 aligned over the boundary between pixel blocks BK1 and BK2.

The difference in signal level between the pixels x1 and x2 in the block BK1 is d1, and that between x3 and x4 in the block BK2 is d3. The signal difference between the pixels x2 and x3 adjacent to each other over the block boundary is d2. The difference d2 is larger than d1 and d3, thus causing generation of block noises.

The block noise can be detected by comparison of signal level over the block boundary for reduction if the boundary is already known. If not, however, the block boundary must to be detected from an input video signal.

Such noise reduction requires precise boundary detection by, for example, a decoding apparatus capable of outputting pulse signals that indicate pixel block boundaries.

Japanese Unexamined Patent Publication Nos. 1991(3)-174891 and 1996(8)-149470 disclose other techniques for detecting and reducing block noises. These techniques however require a bulk of circuitry.

SUMMARY OF THE INVENTION

A purpose of the present invention is to provide an apparatus and a method of detection and reduction of block noises with no requirement of detecting pixel block boundaries of an input video signal.

Another purpose of the present invention is to provide an apparatus for detecting and reducing block noises with relatively small circuitry.

The present invention provides an apparatus for detecting a block noise generated on an input video signal that has been code and decoded per pixel block. The apparatus includes: a differentiator to differentiate the input video signal per pixel block to obtain a differentiated signal; a detector to detect impulses of the differentiated signal to obtain a detection signal carrying the impulses; an integrator to integrate the detection signal; and a determinator to compare the detection signal and a reference signal to determine whether the block noise is generated on the input video signal.

Furthermore, the present invention provides an apparatus for reducing a block noise generated on an input video signal that has been code and decoded per pixel block. The apparatus includes: a differentiator to differentiate the input video signal per pixel block to obtain a differentiated signal and detect impulses of the differentiated signal, thus outputting a detection signal carrying the impulses; a filter to filter the detection signal to obtain a correction signal; a delay section to delay the input video signal by a predetermined period; and an adder to add the correction signal to the delayed video signal to cancel a difference in signal level on the boundary between a first pixel block on which a block noise is generated and a second pixel block adjacent to the first pixel block of the input video signal.

Moreover, the present invention provides a method of detecting a block noise generated on an input video signal that has been code and decoded per pixel block. The input video signal is differentiated per pixel block to obtain a differentiated signal. Impulses of the differentiated signal are detected to obtain a detection signal carrying the impulses. The detection signal is integrated. The integrated detection signal is compared with a reference signal to determine whether the block noise is generated on the input video signal.

The present invention further provides a method of reducing a block noise generated on an input video signal that has been code and decoded per pixel block. The input video signal is differentiated per pixel block to obtain a differentiated signal and detect impulses of the differentiated signal, thus outputting a detection signal carrying the impulses. The detection signal is filtered to obtain a correction signal. The input video signal is delayed by a predetermined period. The correction signal is added to the delayed video signal to cancel a difference in signal level on the boundary between a first pixel block on which a block noise is generated and a second pixel block adjacent to the first pixel block of the input video signal.

The present invention still provides a computer-implemented method of detecting a block noise generated on an input video signal that has been code and decoded per pixel block. The input video signal is differentiated per pixel block to obtain a differentiated signal. Impulses of the differentiated signal are detected to obtain a detection signal carrying the impulses. The detection signal is integrated. The integrated detection signal is compared with a reference signal to determine whether the block noise is generated on the input video signal.

The present invention also provides a computer-implemented method of reducing a block noise generated on an input video signal that has been code and decoded per pixel block. The input video signal is differentiated per pixel block to obtain a differentiated signal and detect impulses of the differentiated signal, thus outputting a detection signal carrying the impulses. The detection signal is filtered to obtain a correction signal. The input video signal is delayed by a predetermined period. The correction signal is added to the delayed video signal to cancel a difference in signal level on the boundary between a first pixel block on which a block noise is generated and a second pixel block adjacent to the first pixel block of the input video signal.

Furthermore, the present invention provides a processor readable medium storing program code for causing a computer to detect a block noise generated on an input video signal that has been code and decoded per pixel block. The processor readable medium stores: first program code means for differentiating the input video signal per pixel block to obtain a differentiated signal; second program code means for detecting impulses of the differentiated signal to obtain a detection signal carrying the impulses; third program code means for integrating the detection signal; and fourth program code means for comparing the integrated detection signal and a reference signal to determine whether the block noise is generated on the input video signal.

Moreover, the present invention provides a processor readable medium storing program code for causing a computer to reduce a block noise generated on an input video signal that has been code and decoded per pixel block. The processor readable medium stores: first program code means for differentiating the input video signal per pixel block to obtain a differentiated signal and detect impulses of the differentiated signal, thus outputting a detection signal carrying the impulses; second program code means for filtering the detection signal to obtain a correction signal; third program code means for delaying the input video signal by a predetermined period; and fourth program code means for adding the correction signal to the delayed video signal to cancel a difference in signal level on the boundary between a first pixel block on which a block noise is generated and a second pixel block adjacent to the first pixel block of the input video signal.

DETAILED DESCRIPTION OF PREFERRED EMBODIMENTS

Preferred embodiments according to the present invention will be disclosed with reference to the attached drawings.

Figure 2:
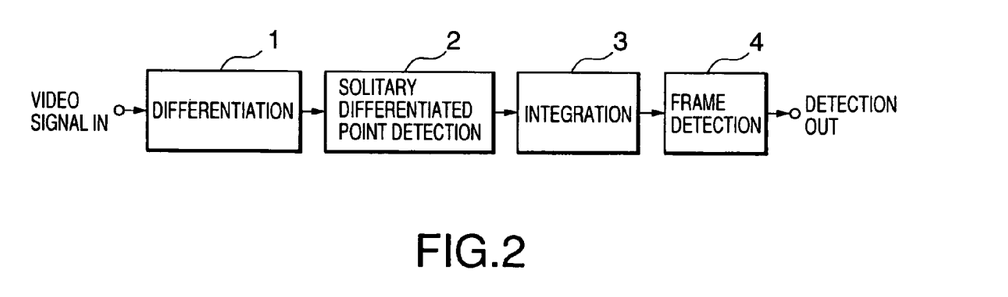
FIG. 2 shows a block diagram of a preferred embodiment of a block noise detection apparatus according to the present invention.

FIG. 2 shows a block diagram of a preferred embodiment of a block noise detection apparatus according to the present invention.

An input video signal that has been coded and decoded per pixel block is differentiated by a differentiating circuit 1. The differentiated video signal is supplied to a solitary differentiated point detector 2.

The detector 2 outputs a detection signal that indicates solitary differentiated points on the differentiated video signal. The detection signal is integrated by an integrator circuit 3.

The integrated detection signal is supplied to a frame detector 4 for detection of a video frame carrying block noises.

The functions of the differentiating circuit 1 and the solitary differentiated point detector 2 are explained with reference to FIGS. 3A to 3C.

Figure 3A:
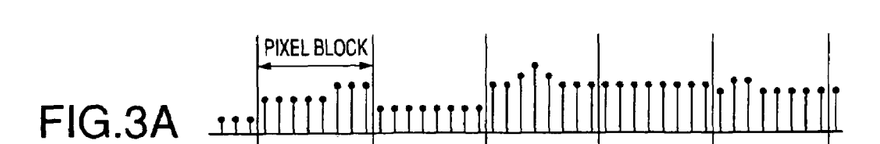
FIGS. 3A to 3C illustrate the differentiation and solitary differentiated points detection functions of the block noise detection apparatus shown in FIG. 2.

Illustrated in FIG. 3A are input video signal components for five pixel blocks to be supplied to the differentiating circuit 1. Each pixel block consists of eight pixels in both the horizontal and the vertical directions.

Figure 3B:
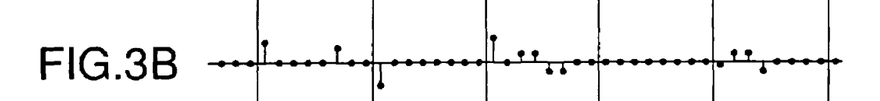

The differentiated video signal shown in FIG. 3B is output by the differentiating circuit 1 and supplied to the solitary differentiated point detector 2.

Figure 3C:
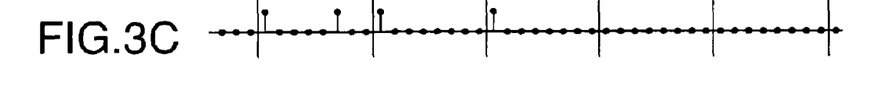

The detector 2 outputs the detection signal that carries impulses as shown in FIG. 3C and indicates solitary differentiated points on the differentiated video signal. The detection signal is supplied to the integrator circuit 3 and then the frame detector 4.

Figure 4:
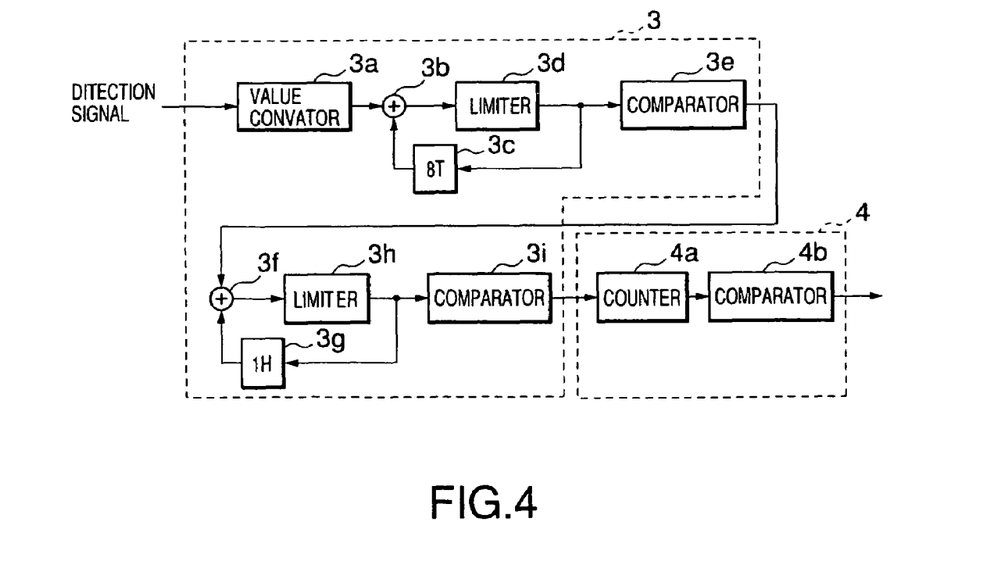
FIG. 4 shows block diagrams of the integrator circuit and the frame detector of the block noise detection apparatus shown in FIG. 2.

The integrator circuit 3 and the frame detector 4 are disclosed in detail with reference to FIG. 4.

The solitary differentiated points detection signal output by the detector 2 is supplied to a value converter 3a. The converter 3a outputs "1" when the detection signal is HIGH (FIG. 3C) while it outputs "−1" when the detection signal is LOW.

The output of the value converter 3a is supplied to an adder 3b whose output is then supplied to a limiter 3d having predetermined upper and lower limit levels.

The output of the limiter 3d is clipped at the upper and lower limit levels and supplied to a delay circuit 3c and delayed by eight pixels (8T). The delayed signal is supplied to the adder 3b and added to the output of the value converter 3a.

In FIG. 4, the delay circuit 3c delays the output of the limiter 3d by eight pixels for an input video signal that carries pixel blocks each consisting of 64 pixels (8×8 in the horizontal and the vertical directions).

The output of the limiter 3d is supplied to a comparator 3e and compared with a predetermined reference level. The comparator 3e outputs "1" when the output of the limiter 3d is higher than the reference level, while it outputs "−1" when the output is equal to or lower than the reference level.

By the signal processing of the integrator circuit 3 described so far, the solitary differentiated points detection signal is accumulated per eight pixels in the horizontal direction to gain an integrated value of the detection signal in the horizontal direction.

The output (integrated value in the horizontal direction) of the comparator 3e is supplied to an adder 3f and then to a limiter 3h having predetermined upper and lower limit levels.

The output of the limiter 3h is clipped at the upper and lower limit levels and supplied to a delay circuit 3g and delayed by one horizontal line period (1H). The delayed signal is supplied to the adder 3f and added to the output of the comparator 3e.

The output of the limiter 3h is supplied to a comparator 3i and compared with a predetermined reference level. The comparator 3i outputs "1" when the output of the limiter 3h is higher than the reference level, while it outputs "−1" when the output is equal to or lower than the reference level.

By the signal processing of the integrator circuit 3 described so far, in addition to the processing in the horizontal direction, the solitary differentiated points detection signal is accumulated per eight pixels also in the vertical direction to gain an integrated value of the detection signal in the horizontal and the vertical directions.

Next, the signal processing of the frame detector 4 is disclosed.

The output (integrated value in the horizontal and the vertical directions) of the comparator 3i is supplied to a counter 4a. The counter 4a counts the number of "1" output by the comparator 3i and outputs the counted number per video frame. The number counted by the comparator 4a per frame depends on the degree of generation of block noises for each frame.

The output (counted number) of the counter 4a is supplied to a comparator 4b and compared with a predetermined reference level. The comparator 4b outputs "1" when the output of the counter 4a is higher than the reference level, while it outputs "−1" when the output is equal to or lower than the reference level.

The output "1" of the comparator 4b indicates that block noises are generated on a frame, while the output "−1" indicates no generation of block noises.

Figure 5:
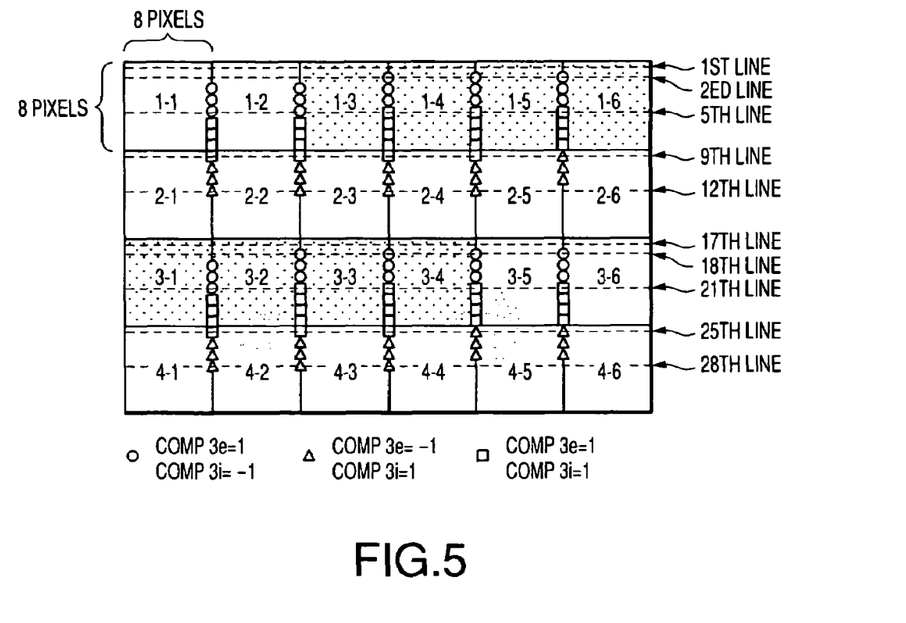
FIG. 5 illustrates the functions of the integrator circuit and the frame detector of the block noise detection apparatus shown in FIG. 2.

The functions of the integrator circuit 3 and the frame detector 4 are illustrated in FIG. 5.

In FIG. 5, the numerals 1-1 to 4-6 represent pixel blocks each consisting of eight pixels in both the horizontal and the vertical directions.

It is assumed that block noises are generated on the pixel blocks 1-3, 1-4, 1-5 and 1-6, and also 3-1, 3-2, 3-3 and 3-4.

Furthermore, it is assumed that the signs ○, Δ and □ in FIG. 5 indicate locations of a video frame according to the outputs of the comparators 3e and 3i (FIG. 4) as follows:

The signs ○ indicate portions of the frame where the outputs of the comparators 3e and 3i are "1" and "−1", respectively.

The signs Δ indicate portions of the frame where the outputs of the comparators 3e and 3i are "−1" and "1", respectively.

The signs □ indicate portions of the frame where the outputs of the comparators 3e and 3i are both "1".

Firstly, the solitary differentiated points detection signal for the first line on the blocks 1-1 to 1-6 is supplied to the value converter 3a (FIG. 4).

The solitary differentiated points detection signal is accumulated per eight pixels in the horizontal direction by the addition loop circuitry consisting of the adder 3b, limiter 3d and delay circuit 3c (FIG. 4).

This process goes to the next lines one by one.

No block noises are generated on the blocks 1-1 and 1-2 according to the assumption. In these blocks, pixels adjacent to each other in the horizontal direction have a difference in signal level. And hence a solitary differentiated points detection signal for the blocks 1-1 and 1-2 may be "H". It is however very rare that the level "H" is continuously output per eight pixels. The output of the limiter 3d therefore has a tendency to rise only on the borders between the blocks 1-2 and 1-3, 1-3 and 1-4, 1-4 and 1-5, and also 1-5 and 1-6.

The level "H" will be continuously output per eight pixels as the solitary differentiated points detection signal when block noises are generated on the blocks 1-1 and 1-2.

According to the assumption on the signs ○ and □, the limiter 3d goes beyond the reference level of the comparator 3e, so that the comparator 3e outputs "1" on the border between the blocks 1-3 and 1-4 on the second line. The comparator 3e continuously outputs "1" on the border between the blocks 2-4 and 2-5 from the second line to the ninth line, as shown in FIG. 5.

Since it is assumed that no block noises are generated on the blocks 2-1 to 2-6, the output of the limiter 3d has a tendency to lower on the block borders from the ninth line. The output of the limiter 3d becomes lower than the reference level of the comparator 3e on the border between the blocks 2-5 and 2-6 on the ninth line, so that the comparator 3e continuously outputs "−1" from that portion.

On the other hand, since it is assumed that block noises are generated on the blocks 3-1 to 3-4, the output of the limiter 3d has a tendency to rise on the block borders from the 18-th line. The output of the limiter 3d goes beyond the reference level of the comparator 3e from the border between the blocks 3-2 and 3-3 on the 18-th line to the border between the blocks 4-3 and 4-4 on the 25-th line. The comparator 3e thus continuously outputs "1" from the 18-th to 25-th line.

In FIG. 4, the addition loop circuitry consisting of the adder 3f, limiter 3h and delay circuit 3g accumulates the output of the comparator 3e in the vertical direction. The output of the limiter 3h rises on the block borders where block noises are generated. The comparator 3i then outputs "1" when the output of the limiter 3h goes beyond the reference level of the comparator 3i.

As described above, according to the assumption in this embodiment, the comparator 3e continuously outputs "1" from the second line on the border between blocks 1-3 and 1-4 to the ninth line on the border between blocks 2-4 and 2-5. The output of the limiter 3h thus rises and goes beyond the reference level of the comparator 3i on the border between blocks 1-3 and 1-4 on the fifth line, so that the comparator 3i outputs "1" on each block border.

On the other hand, the comparator 3e continuously outputs "−1" from the ninth line on the border between blocks 2-5 and 2-6. The output of the limiter 3h becomes lower than the reference level of the comparator 3i on the border between blocks 2-5 and 2-6 on the 12-th line, so that the comparator 3i outputs "−1" on each block border.

Since assumption is made such that block noises are generated on the blocks 3-1 to 3-4, the output of the limiter 3h has a tendency to rise from the 18-th line on the border between the blocks 3-2 and 3-3, and goes beyond the reference level of the comparator 3i from the 21-th line on the border between the blocks 3-2 and 3-3 to the 28-th line on the border between the blocks 4-3 and 4-4. The comparator 3i thus outputs "1".

The counter 4a counts the number of "1" output by the comparator 3i per frame. The counted value is 74 that corresponds to the total number of Δ and □ in this example of FIG. 5.

The counted value of the counter 4a is compared with the reference level of the comparator 4b to determine whether block noises are generated on a video frame. As already described, the output "1" of the comparator 4b indicates that block noises are generated on a frame, while the output "−1" indicates no generation of block noises.

Figure 6:
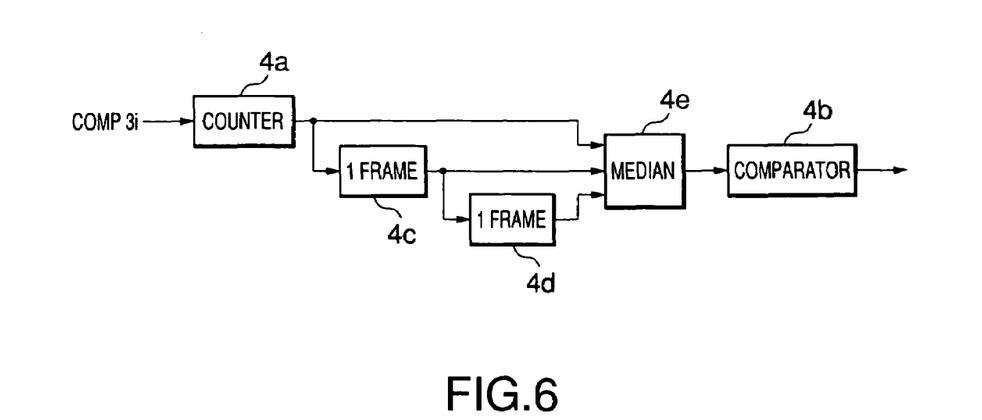
FIG. 6 shows a block diagram of a modification of the frame detector of the block noise detection apparatus shown in FIG. 2.

Next, a modification of the frame detector 4 of the block noise detection apparatus is disclosed with reference to FIG. 6. This modification is suitable for a video signal according to the MPEG (Moving Picture Coding Experts Group) standard.

Elements shown in FIG. 6 that are the same as or analogous to elements shown in FIG. 4 are referenced by the same reference numbers and will not be explained in detail.

The output of the comparator 3i (FIG. 4) is supplied to the counter 4a (FIG. 6) and its output is supplied to a median circuit 4e.

Also supplied to the median circuit 4e are the output of a delay circuit 4c by which the output of the counter 4a (FIG. 6) has been delayed by one frame and also the output of a delay circuit 4d by which the output of the delay circuit 4c has been delayed by one frame.

In another word, the counted values for three continuous frames are supplied to the median circuit 4e.

The median circuit 4e outputs the middle value among the three counted values. The middle value is then supplied to the comparator 4b for detection of block noises.

In this modification, the median circuit 4e offers protection of reproduced images from chattering which would occur when the output of the comparator 4b changes frequently between "1" and "−1".

Such frequent change in level occurs, for example, when block noises are generated on B frames but not on an I frame of a group of sequential B, B, I, B, B frames of a video signal according to the MPEG standard where B and I denote a predictive-coded frame and an intra-coded frame, respectively.

For such an MPEG video signal, the frame delay conducted by the delay circuits 4c and 4d (FIG. 6) applies the hysteresis characteristics to the output of the counter 4a and its middle value is output by the median circuit 4e. Reproduced images thus can be protected from chattering.

As described above, the present invention achieves block noise detection based on the facts that the differentiated signal output by the differentiating circuit 1 (FIG. 2) is noticeable as shown in FIG. 3B due to abrupt change in signal level of pixels around which block noises are generated, and also the level change occurs cyclically per pixel block.

The integration characteristics of the integrator circuit 3 (FIG. 4) can be adjusted according to the size of pixel blocks for accurate block noise detection.

Furthermore, the solitary differentiated points detection signal is integrated in both the horizontal and the vertical directions by the integrator circuit 3 in FIG. 4. The integration process may however be proceeded in only the horizontal direction. In this case, the output of the comparator 3e is directly supplied to the counter 4a for block noise detection based on the value of "1" output by the comparator 3e and counted by the counter 4a.

Figure 7:
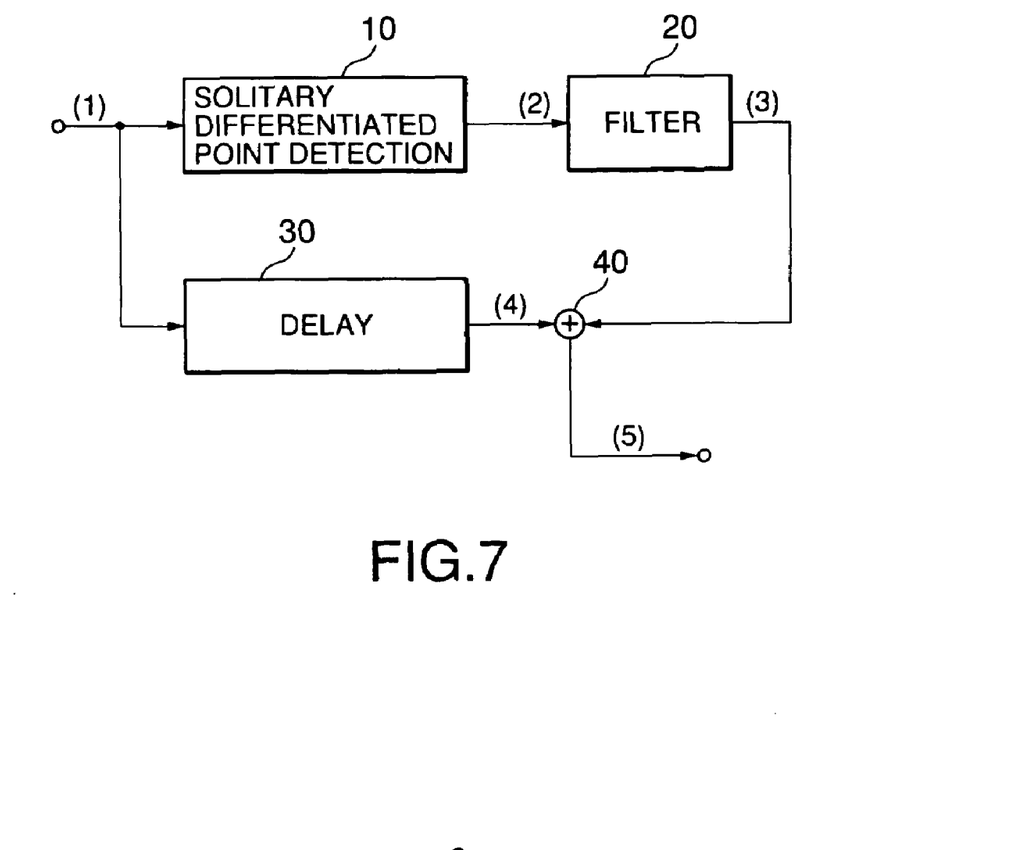
FIG. 7 shows a block diagram of a preferred embodiment of a block noise reduction apparatus according to the present invention.

Described next with respect to FIG. 7 is a preferred embodiment of a block noise reduction apparatus according to the present invention.

An input video signal (1) that has been coded and decode per pixel block is supplied to a solitary differentiated point detector 10. The detector 10 differentiates the input signal (1) and outputs a detection signal (2) that indicates a solitary differentiated point. The detection signal (2) is filtered by a filter 20 and supplied to an adder 40.

The input video signal (1) is also supplied to a delay unit 30. The input signal (1) is delayed by a predetermined period and supplied to the adder 40. The adder 40 adds the output signals (3) and (4) of the filter 20 and the delay unit 30, respectively, to output a signal (5).

Figure 8:
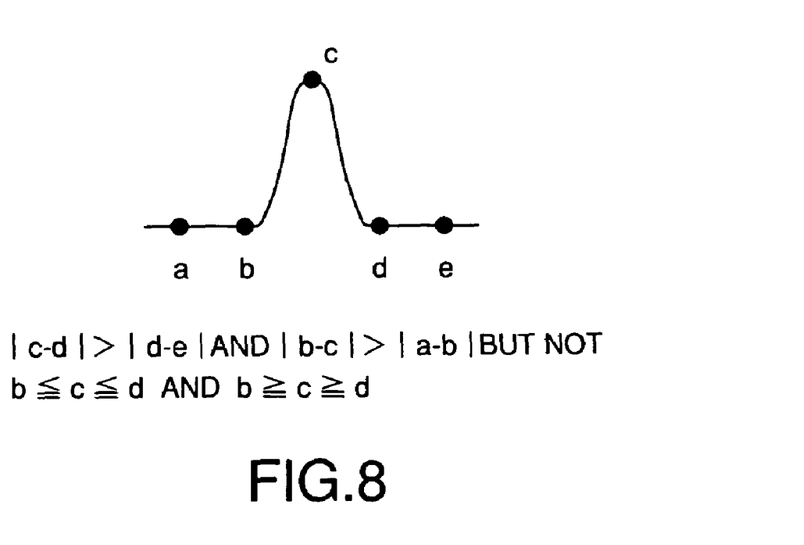
FIG. 8 illustrates the solitary differentiated point detection according to the present invention.

Illustrated in FIG. 8 is an example of the solitary differentiated point detection.

The solitary differentiated point detector 10 has a logical filter that filters the input video signal (1) to output an impulse signal as shown in FIG. 8 as the detection signal (2).

The detector 10 differentiates the input video signal (1) and compares the differentiated values (a, b, c, d and e) of adjacent pixels to output the differentiated value (c) of the pixel, which juts out compared to the values of other pixels.

In detail, in this example, the detector 10 outputs the value (c) that satisfies the condition $|c-d|>|d-e|$ and $|b-c|>|a-b|$ but does not satisfy the condition $b \leq c \leq d$ and $b \geq c \geq d$. The detection of the solitary differentiated point can also be conducted by the same way as illustrated in FIGS. 3A to 3C.

Figure 9:
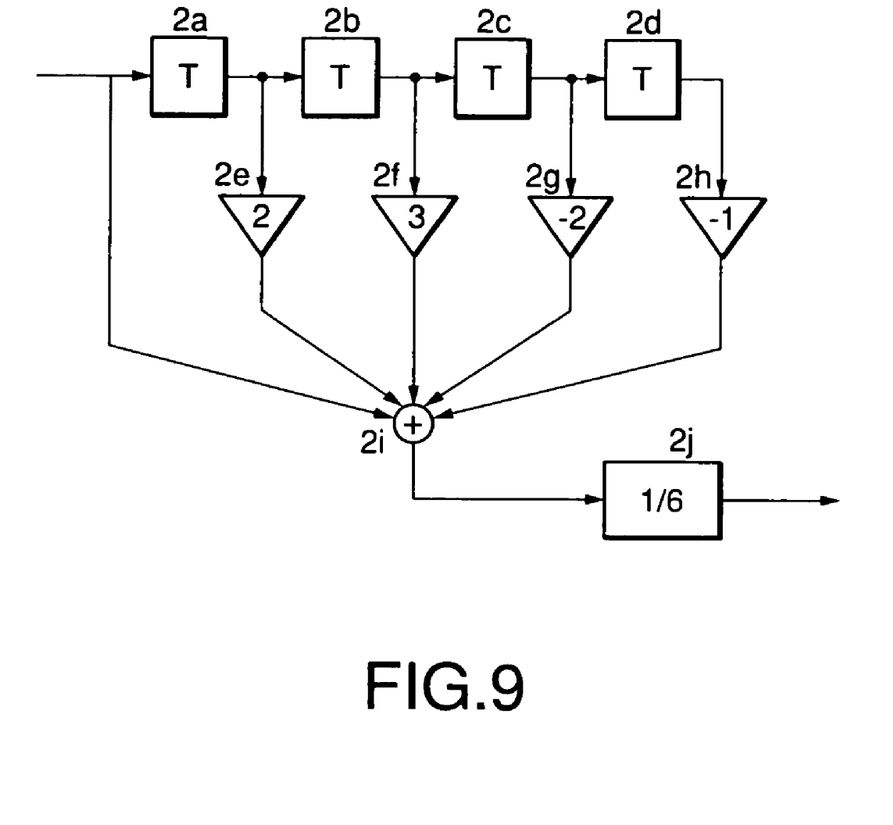
FIG. 9 shows a block diagram of a filter for filtering a solitary differentiated point detection signal shown in FIG. 8.

The value (c) is then supplied as the detection signal (2) to the filter 20 (FIG. 7) a block diagram of which is shown in FIG. 9.

The detection signal (2) is delayed by delay elements 2a to 2d by a period (T) that corresponds to one pixel for each delay element, totally five pixels.

The outputs of the delay elements 2a to 2d are supplied to multipliers 2e to 2h and assigned weights 2, 3, −2 and −1, respectively.

The outputs of the multipliers 2e to 2h are supplied to an adder 2i. The detection signal (2) is also supplied to the adder 2i.

The output of the adder 2i is then supplied to a ⅙ processor 2j and reduced by ⅙. The ⅙-reduced output (a correction signal) is supplied as the signal (3) to the adder 40 (FIG. 7).

The input video signal (1) is delayed by the delay unit 30 by a period that corresponds to two pixels and supplied to the adder 40 that outputs the signal (5).

The function of the block noise signal reduction apparatus shown in FIG. 7 is further explained with reference to FIGS. 10A to 10E.

Figure 10A:
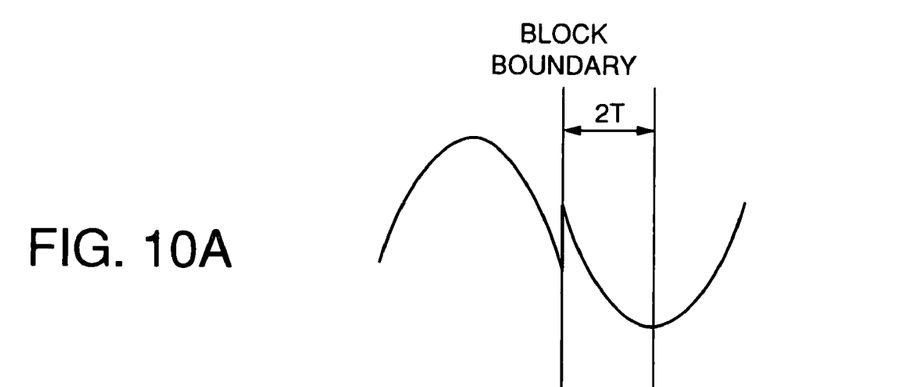
FIGS. 10A to 10E illustrate the function of the block noise signal reduction apparatus shown in FIG. 7.

The input video signal (1) having a gradation difference (noise) on the boundary between pixel blocks as shown in FIG. 10A is differentiated by the solitary differentiated point detector 10. The detector 10 outputs the detection signal (2) as shown in FIG. 10B that indicates the solitary differentiated point (c) of FIG. 8.

Figure 10B:
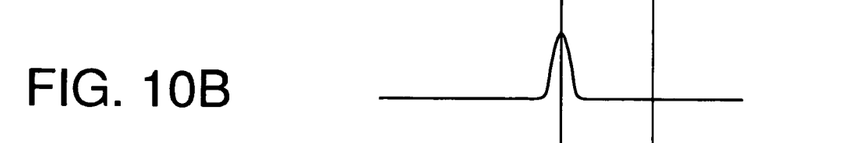
Figure 10C:
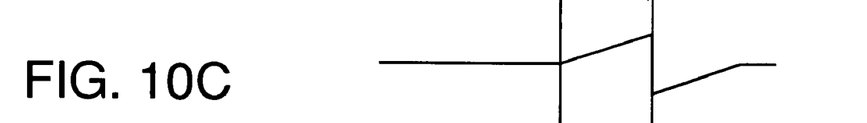

The detection signal (2) of FIG. 10B is filtered by the filter 20 as explained with reference to FIG. 9, to be the correction signal as shown in FIG. 10C, which is then supplied to the adder 40.

Figure 10D:
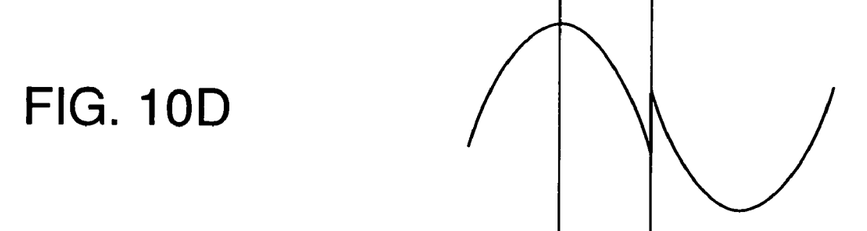

The input video signal (FIG. 10A) is delayed by the delay unit 30 by the period that corresponds to two pixels (2T) as shown in FIG. 10D and supplied to the adder 40.

Figure 10E:
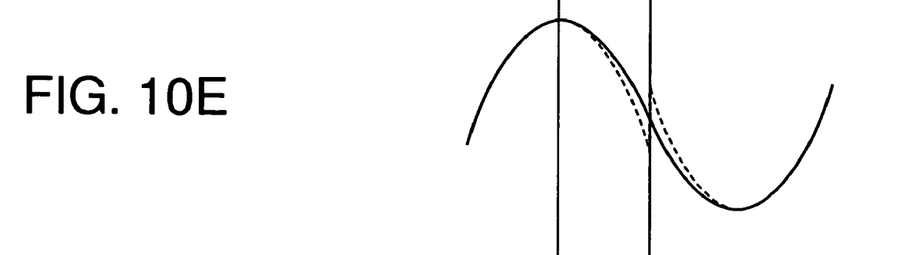

The delayed video signal and the correction signal are added by the adder 40 which then outputs a corrected video signal as shown in FIG. 10E.

As described above, the noise reduction apparatus shown in FIG. 7 generates the correction signal (FIG. 10C) for canceling the gradation difference on the block boundary (FIG. 10A) for obtaining a smooth video signal with no abrupt step on the boundary as shown in FIG. 10E.

Figure 11:
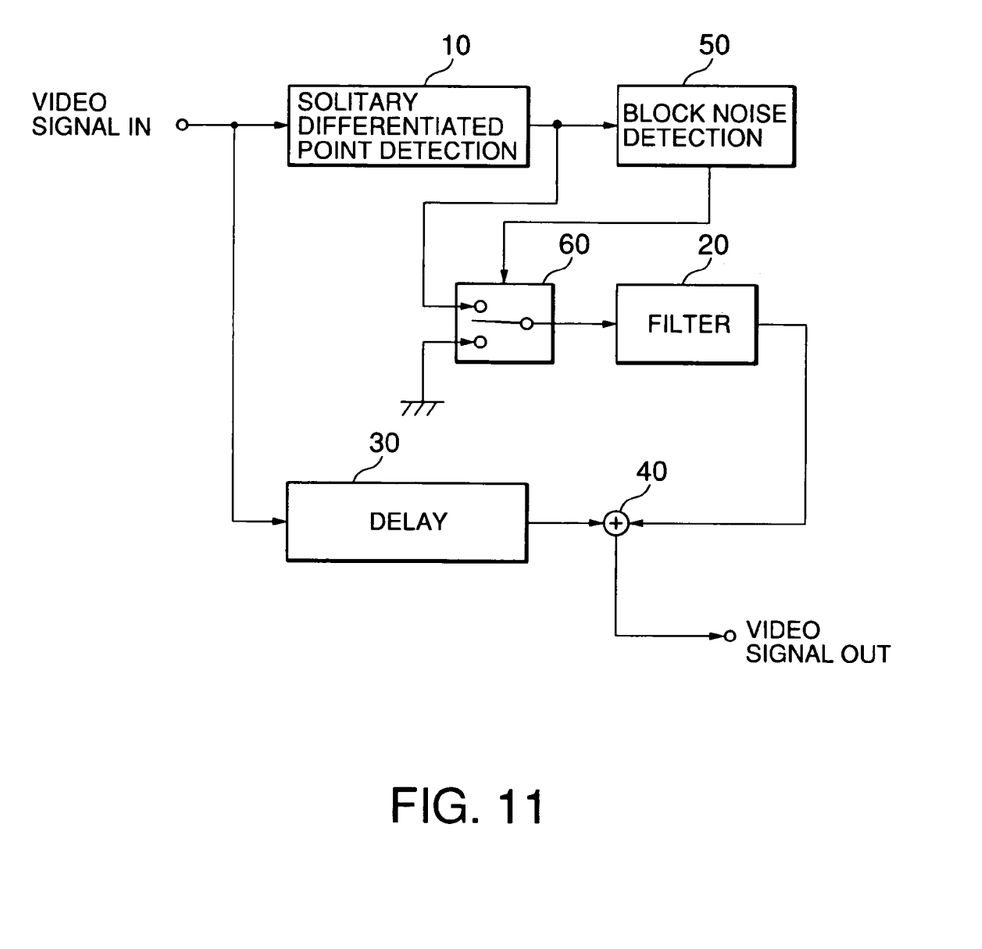
FIG. 11 shows a block diagram of another preferred embodiment of a block noise reduction apparatus according to the present invention.

Another preferred embodiment of a block noise reduction apparatus according to the present invention is described with respect to FIG. 11.

Elements in the embodiment shown in FIG. 11 that are the same as or analogous to elements in the embodiment of FIG. 7 are referenced by the same reference numerals and will not be explained in detail.

The block noise reduction apparatus (FIG. 11) is provided with a block noise detection unit 50 and a switch 60 between the solitary differentiated point detector 10 and the filter 20.

Block noise reduction processing is made on/off by the switch 60 according to the result of detection by the block noise detection unit 50.

As for the block noise detection unit 50, the integrator circuit 3 shown in FIG. 4, and the frame detector shown in FIG. 6 are employed in this embodiment.

When a block noise is generated on a video frame, the comparator 4b of the frame detector outputs the value "1" as explained with reference to FIG. 6. The value "1" is supplied to the switch 60 (FIG. 11) that allows the detection signal output by the solitary differentiated point detector 10 to pass therethrough and be supplied to the filter 20 for noise reduction.

On the other hand, when almost no block noise is generated, the comparator 4b outputs the value "0" which is then supplied to the switch 60. The switch 60 in this case outputs a zero-level signal for cutting off the noise reduction processing.

As explained with reference to FIG. 6, the median circuit 4e offers protection of reproduced images from chattering which would occur when the output of the comparator 4b changes frequently between "1" and "−1". This will be the cause of chattering of the switch 60 (FIG. 11).

Such frequent change in level occurs, for example, when block noises are generated on B frames but not on an I frame of a group of sequential B, B, I, B, B frames of a video signal according to the MPEG standard.

For such an MPEG video signal, the frame delay conducted by the delay circuits 4c and 4d (FIG. 6) applies the hysteresis characteristics to the output of the counter 4a and its middle value is output by the median circuit 4e. This avoids chattering of the switch 60 (FIG. 11) for reproducing images with less noises.

The present invention has been described in detail with reference to various hardware devices, however, it will be appreciated by those skilled in the art that the present invention can also be implemented in software which will be stored on a CD-ROM type storage medium or downloaded via net work, for example, to cause a computer to detect and/or reduce block noises generated on video signals.

As disclosed above, according to the present invention, block noises are detected by differentiating input video signals for obtaining solitary differentiated points and integrating the points.

The present invention thus achieves precise block noise detection even though boundaries between pixel blocks are unknown.

The precise block noise detection is further achieved by integration processing in both the horizontal and the vertical directions for generating impulses that have correlation with block noise in both directions.

Furthermore, as disclosed above, according to the present invention, block noises are reduced by differentiating input video signals to obtain solitary differentiated points for generating correction signals for canceling differences in signal levels on pixel block boundaries.

The present invention thus achieves block noise reduction with relatively small circuitry.

Moreover, the block noise reduction processing according to the present invention is applied only to video frames on which many block noises are generated to avoid chartering.

The present invention thus achieves block noise reduction with the least deterioration of images.

What is claimed is:

1. An apparatus for detecting a block noise generated on an input video signal that has been coded and decoded per pixel block, the apparatus comprising:
   a differentiator to differentiate the input video signal per pixel to obtain a differentiated signal;
   a detector to detect impulses of the differentiated signal to obtain a detection signal carrying the impulses;
   an integrator to integrate the detection signal for every N-th pixel of consecutive M pixels in a horizontal direction and to obtain integrated detection signals corresponding to a first to an M-th pixels, respectively, M being the number of pixels per pixel block in the horizontal direction, and N being an integer among 1 to M; and
   a determinator to compare the integrated detection signals and a reference signal to determine whether the block noise is generated on the input video signal, wherein the determinator includes:
   a counter to count the number of integrated impulses of the integrated detection signal per predetermined unit of image carried by the input video signal;
   a plurality of delay sections each delaying the counted number by a period decided based on the predetermined unit of image, thus outputting count signals for succeeding images in the predetermined unit of image; and
   a median section to select a middle count signal among the count signals, which is the middle in level, the middle count signal being compared with the reference signal.

2. A method of detecting a block noise generated on an input video signal that has been coded and decoded per pixel block, comprising the steps of:
   differentiating the input video signal per pixel to obtain a differentiated signal;
   detecting impulses of the differentiated signal to obtain a detection signal carrying the impulses;
   integrating the detection signal for every N-th pixel of consecutive M pixels in a horizontal direction and to obtain integrated detection signals corresponding to a first to an M-th pixels, respectively, M being the number of pixels per pixel block in the horizontal direction, and N being an integer among 1 to M; and
   comparing the integrated detection signals and a reference signal to determine whether the block noise is generated on the input video signal, wherein the comparing step includes the steps of:
   counting the number of integrated impulses of the integrated detection signal per predetermined unit of image carried by the input video signal;
   delaying the counted number by a period decided based on the predetermined unit of image, thus outputting count signals in the predetermined unit of image; and
   selecting a middle count signal among the count signals, which is the middle in level, the middle count signal being compared with the reference signal.

3. An apparatus for detecting a block noise generated on an input video signal that has been coded and decoded per pixel block, the apparatus comprising:
   a differentiator to differentiate the input video signal at every neighbouring pixel to obtain a differentiated signal;
   a first detector to detect solitary differentiated points on the differentiated signal and output a first detection signal having a first level for each solitary differentiated point and a second level for each portion of the differentiated signal at which no solitary differentiated point is detected; and a first processor to receive the first detection signal and a first delay signal, output a first addition signal in which the first detection signal and the first delay signal are added to each other and delay the first addition signal by a period corresponding to a total number of pixels in a horizontal direction in each pixel block, the first addition signal thus delayed being fed back to the first processor as the first delay signal, the block noise generated on the input video signal being detected based on the first addition signal.

4. The apparatus according to claim 3 further comprising:

a second detector to receive the first addition signal and output a second detection signal, the second detection signal having a third level when a level of the first addition signal is higher than a first reference level whereas the second detection signal having a fourth level when the level of the first addition signal is equal to or lower than the first reference level; and a second processor to receive the second detection signal and a second delay signal, output a second addition signal in which the second detection signal and the second delay signal are added to each other and delay the second addition signal by one horizontal line period of the input video signal, the second addition signal thus delayed being fed back to the second processor as the second delay signal, the block noise generated on the input video signal being detected based on the second addition signal.

5. The apparatus according to claim 4 further comprising:

a third detector to receive the second addition signal and output a third detection signal, the third detection signal having a fifth level when a level of the second addition signal is higher than a second reference level whereas the third detection signal having a sixth level when the level of the second addition signal is equal to or lower than the second reference level; and a counter to count a total number of first signal portions of the third detection signal per frame of the input video signal, each first signal portion having the fifth level, the block noise generated on the input video signal being detected based on the counted number of the first signal portions.

6. The apparatus according to claim 5 further comprising a plural number of delay units to delay a count signal output from the counter by a period corresponding to a specific number of frames of the input video signal, the count signal carrying the counted number per frame of the input video signal, the specific number of frames being equal to the plural number of delay units, the block noise generated on the input video signal being detected based on a middle number among the counted number carried by the count signal and numbers counted for the specific number of frames.

7. A method of detecting a block noise generated on an input video signal that has been coded and decoded per pixel block, comprising the steps of:

differentiating the input video signal at every neighbouring pixel to obtain a differentiated signal;

detecting solitary differentiated points on the differentiated signal and outputting a first detection signal having a first level for each solitary differentiated point and a second level for each portion of the differentiated signal at which no solitary differentiated point is detected; and receiving the first detection signal and a first delay signal, outputting a first addition signal in which the first detection signal and the first delay signal are added to each other and delaying the first addition signal by a period corresponding to a total number of pixels in a horizontal direction in each pixel block, the first addition signal thus delayed being used as the first delay signal, the block noise generated on the input video signal being detected based on the first addition signal.

8. The method according to claim 7 further comprising the steps of:

receiving the first addition signal and outputting a second detection signal, the second detection signal having a third level when a level of the first addition signal is higher than a first reference level whereas the second detection signal having a fourth level when the level of the first addition signal is equal to or lower than the first reference level; and receiving the second detection signal and a second delay signal, outputting a second addition signal in which the second detection signal and the second delay signal are added to each other and delay the second addition signal by one horizontal line period of the input video signal, the second addition signal thus delayed being used as the second delay signal, the block noise generated on the input video signal being detected based on the second addition signal.

9. The method according to claim 8 further comprising the steps of:

receiving the second addition signal and outputting a third detection signal, the third detection signal having a fifth level when a level of the second addition signal is higher than a second reference level whereas the third detection signal having a sixth level when the level of the second addition signal is equal to or lower than the second reference level; and counting a total number of first signal portions of the third detection signal per frame of the input video signal and outputting a count signal carrying a counted number per frame of the input video signal, each first signal portion having the fifth level, the block noise generated on the input signal being detected based on the counted number of the first signal portions.

10. The method according to claim 9 further comprising the step of delaying the count signal by a period corresponding to a specific number of frames of the input video signal, the block noise generated on the input video signal being detected based on a middle number among the counted number carried by the count signal and numbers counted for the specific number of frames.

* * * * *